(12) United States Patent
Holder et al.

(10) Patent No.: US 9,829,058 B2
(45) Date of Patent: Nov. 28, 2017

(54) METHOD AND APPARATUS FOR THE OPERATION OF A PARKING BRAKE OF A MOTOR VEHICLE

(71) Applicant: Robert Bosch GmbH, Stuttgart (DE)

(72) Inventors: Martin Holder, Nordheim (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/810,528

(22) Filed: Jul. 28, 2015

(65) Prior Publication Data

US 2016/0025169 A1    Jan. 28, 2016

(30) Foreign Application Priority Data

Jul. 28, 2014 (DE) ......................... 10 2014 214 741

(51) Int. Cl.
| | | |
|---|---|---|
| *B60T 7/10* | (2006.01) | |
| *B60T 17/22* | (2006.01) | |
| *F16D 65/18* | (2006.01) | |
| *B60T 13/74* | (2006.01) | |
| *F16D 121/24* | (2012.01) | |
| *F16D 121/04* | (2012.01) | |

(52) U.S. Cl.
CPC ............. *F16D 65/18* (2013.01); *B60T 7/107* (2013.01); *B60T 13/741* (2013.01); *F16D 2121/04* (2013.01); *F16D 2121/24* (2013.01)

(58) Field of Classification Search
CPC ....... B60T 17/22; F16D 65/18; F16D 2121/24
See application file for complete search history.

(56) References Cited

U.S. PATENT DOCUMENTS

| | | | | |
|---|---|---|---|---|
| 6,279,694 B1* | 8/2001 | Bohm | ..................... | B60T 13/74 188/1.11 E |
| 6,663,195 B1* | 12/2003 | Arnold | ..................... | B60T 7/042 303/122.03 |
| 8,515,642 B2* | 8/2013 | Irsigler | ................... | B60T 7/107 188/24.16 |
| 8,710,774 B2* | 4/2014 | Kusano | ..................... | B60L 7/10 318/374 |
| 2002/0104718 A1* | 8/2002 | Suzuki | ..................... | B60T 13/74 188/72.1 |
| 2003/0066719 A1* | 4/2003 | Watanabe | ............... | B60T 1/005 188/72.7 |

(Continued)

*Primary Examiner* — Thomas J Williams
*Assistant Examiner* — James Hsiao
(74) *Attorney, Agent, or Firm* — Maginot, Moore & Beck LLP

(57) ABSTRACT

A method for the operation a parking brake of a motor vehicle that comprises at least one wheel brake device, wherein the wheel brake device comprises an electric motor that can be activated for its actuation and that drives a spindle for the displacement of a brake piston between a clamping position and a release position, wherein for the calibration of the parking brake the electric motor is activated in order to move the brake piston into the release position in a first step and from the release position into the clamping position in a subsequent second step. It is provided that in the second step a power supply of the electric motor is interrupted during the displacement of the brake piston in a no-load phase (II) and at least one motor parameter of the electric motor is determined depending on a coasting behavior of the electric motor.

8 Claims, 4 Drawing Sheets

(56) References Cited

U.S. PATENT DOCUMENTS

| | | | | |
|---|---|---|---|---|
| 2005/0035653 | A1* | 2/2005 | Godlewsky | F16D 65/18 |
| | | | | 303/122.03 |
| 2006/0163939 | A1* | 7/2006 | Kuramochi | B60T 8/885 |
| | | | | 303/122.04 |
| 2008/0054718 | A1* | 3/2008 | Nishino | B60T 8/1755 |
| | | | | 303/146 |
| 2013/0314222 | A1* | 11/2013 | Park | B60Q 1/00 |
| | | | | 340/453 |
| 2013/0325278 | A1* | 12/2013 | Bieltz | B60T 7/107 |
| | | | | 701/70 |
| 2014/0214269 | A1* | 7/2014 | Knechtges | B60T 13/588 |
| | | | | 701/34.4 |

\* cited by examiner

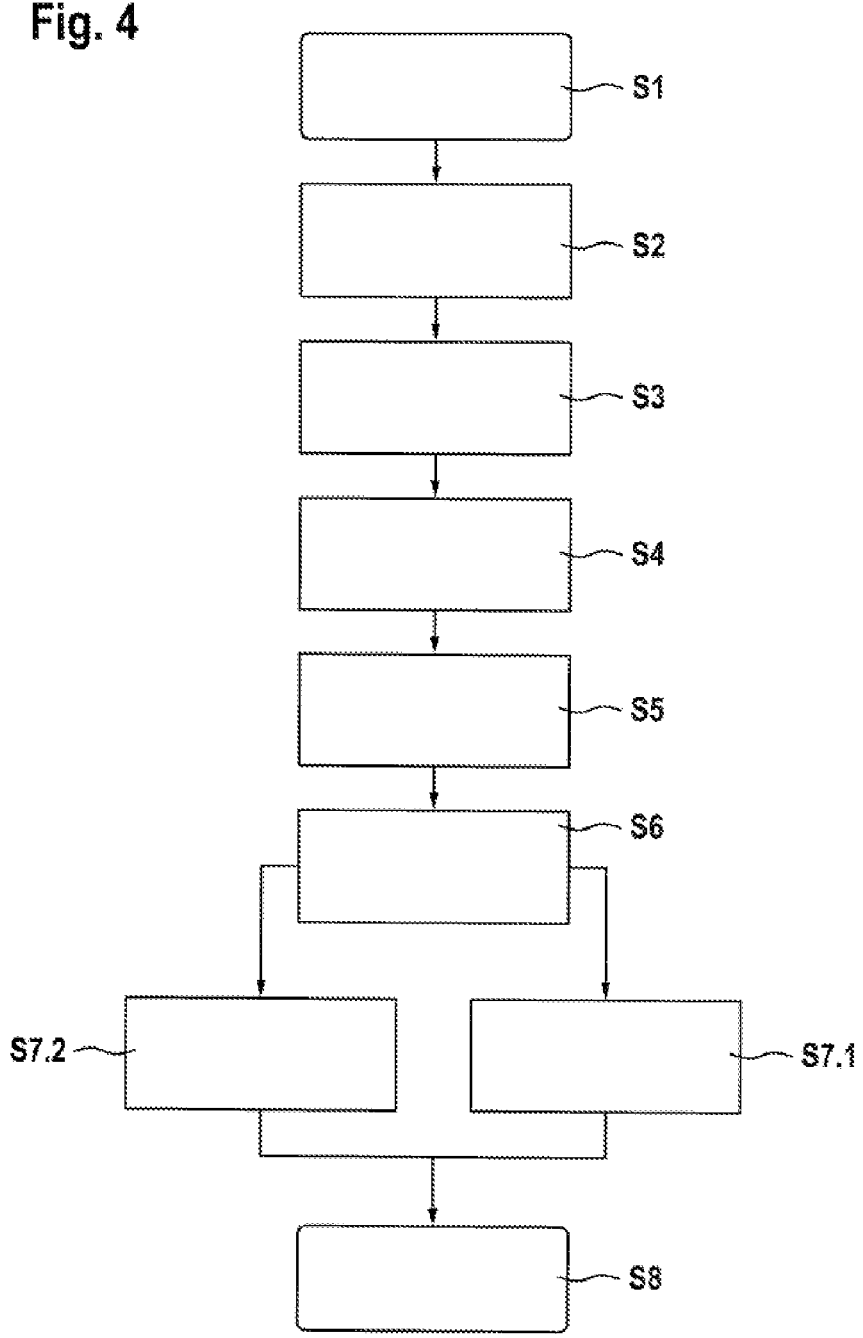

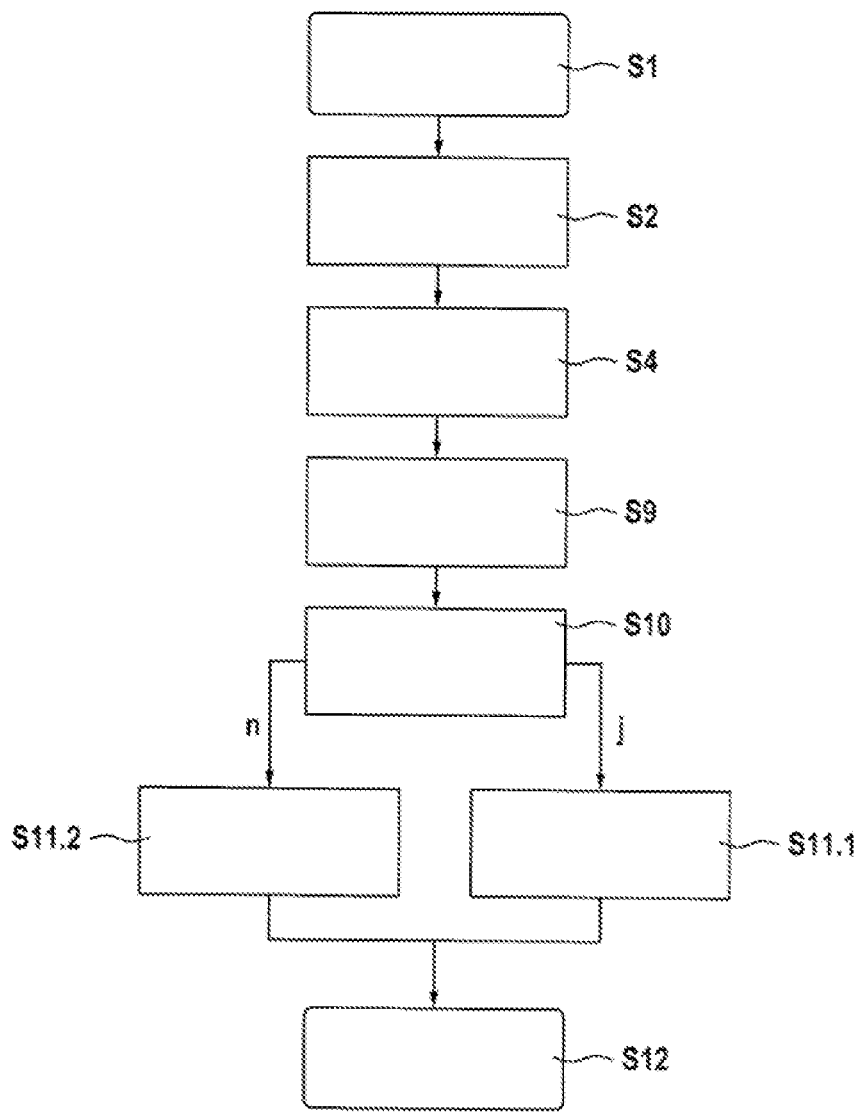

METHOD AND APPARATUS FOR THE OPERATION OF A PARKING BRAKE OF A MOTOR VEHICLE

This application claims priority under 35 U.S.C. §119 to application no. DE 10 2014 214 741.7, filed on Jul. 28, 2014 in Germany, the disclosure of which is incorporated herein by reference in its entirety.

BACKGROUND

The disclosure concerns a method for the operation of a parking brake of a motor vehicle, which comprises at least one wheel brake device, wherein the wheel brake device comprises a driven electric motor for its actuation, which drives a spindle for the displacement of a brake piston of the wheel brake device between a clamping position and a release position, wherein the electric motor is activated for the calibration of the parking brake in order to displace the brake piston into the release position in a first step and from the release position towards the clamping position in a subsequent second step.

The disclosure also concerns a corresponding parking brake, as well as a computer program and a computer program product.

Methods of the aforementioned type are known from the prior art. Parking brakes for motor vehicles generally comprise two wheel brake devices, each associated with a wheel of a rear axle of the motor vehicle in order to lock the same as required. The wheel brake devices are usually provided with an electric motor actuator for this that drives a brake piston of the respective wheel brake device in order to produce a brake force. In this case the brake piston is usually actuated by a spindle that is driven by an electric motor.

A complete and accurate mathematical description of the system dynamics of the parking brake is possible through accurate knowledge of the motor parameters of the electric motor. Besides the motor constant and the motor impedance, the moment of inertia is also a motor parameter that describes the dynamics of the parking brake and is subject to a production spread as with the other motor parameters.

During the initial commissioning or during ongoing operation of a parking brake, it is advantageous if the same is calibrated, in particular in order to know the position of the spindle or of the brake piston for activation of the wheel brake device. During this it is known to calibrate the parking brake by activating the electric motor in order to displace the brake piston into a release position in a first step, and into a clamping position in a subsequent second step. In the release position the brake piston is moved into a non-use position, and in the clamping position the brake piston acts in particular on a brake disk with a brake force. Between the two positions, the brake piston can be displaced by the electric motor, in particular by a spindle that can be driven by the electric motor. By approaching said two end positions, which are characterized by any further movement of the brake piston not being mechanically possible, the parking brake and in particular the electric motor actuator can be calibrated.

SUMMARY

The method according to the disclosure has the advantage that during the calibration process at least one motor parameter of the electric motor is determined that is used to activate the parking brake. This enables the compensation of a production spread of the motor parameters and enables the parking brake to be calibrated in this respect. In particular, the motor parameters of the electric motor can change during ongoing operation, for example because of wear. By the method according to the disclosure it is also possible to detect the same during ongoing operation and to adjust the activation of the electric motor accordingly. According to the disclosure, it is provided that in the second step, i.e. during the no-load phase, a power supply of the electric motor is interrupted during the displacement of the brake piston towards the clamping position and at least one motor parameter of the electric motor is determined depending on the coasting behavior of the electric motor. An additional step is thus integrated into the usual calibration process, by means of which it is possible to determine motor parameters of the electric motor. Furthermore, said method can also be carried out independently of the calibration process. As a result of interrupting the power supply in the no-load phase, in which the brake piston is displaced without exerting a brake force, the electric motor coasts because of the interruption of the power supply. The coasting behavior of the electric motor is influenced during this by its motor parameters. This enables the motor parameters to be determined in the no-load phase and to be used for later activation of the electric motor.

In particular, it is provided that a moment of inertia of the electric motor is determined as a motor parameter as a function of a change of speed, in particular as a function of a change of angular rate, of the electric motor and/or the spindle. If the electric motor is no longer energized, then the speed or the angular rate of its drive shaft reduces because of its internal moment of friction. The moment of inertia opposes the moment of friction in this case. Knowledge of the moment of friction and knowledge of the change of speed thus enables the moment of inertia of the electric motor to be concluded in a simple way.

It is therefore preferably provided that the moment of inertia is determined depending on a moment of friction of the electric motor.

According to an advantageous development of the disclosure, it is provided that the moment of friction in the no-load phase, in particular before the interruption of the power supply, is determined depending on a stored motor constant of the electric motor. As a result a current moment of friction of the electric motor is available, which can be used for evaluation of the moment of inertia.

Particularly preferably, in addition or alternatively the motor constant of the electric motor is determined as a motor parameter as a function of the coasting behavior of the electric motor, in particular as a function of an induction voltage of the electric motor when coasting. By this means the motor constant is also determined during operation of the parking brake, whereby a production spread relating to this is also detected and can be suitably compensated.

Furthermore, it is preferably provided that the determined motor constant is compared with the stored motor constant, wherein the determined motor constant is stored if it deviates from the stored motor constant by more than a limit value that can be specified. During the first performance of the method, the activation of the electric motor is based on a motor constant that is calculated and stored, for example. If the determined motor constant deviates for example by more than 5% from the stored motor constant, then the determined motor constant is stored as the motor constant that is to be used as a basis and is used for further operation of the parking brake. If the motor constant should change again because of wear events, this is recognized by performing the method at a later point in time and is accordingly taken into account by storing a newly determined motor constant.

Furthermore, it is preferably provided that the determined moment of friction is compared with a previously determined moment of friction, and that the determined moment of friction is discarded if it deviates from the previously determined moment of friction by more than a limit value that can be specified. A deviation that is too large is considered to be a false measurement here. Thus in relation to the moment of friction during multiple performances of the method, the current effective moment of friction of the electric motor is always detected and may be stored in order to update the motor parameters of the electric motor. In particular, it is provided that the method is carried out regularly during the operation of the parking brake, in particular depending on time or on the number of activations of the parking brake.

The parking brake according to the disclosure, in one embodiment, is characterized by a specially configured controller that comprises specific means and that is provided to carry out the method according to the disclosure. Further features and advantages arise from what has been described above.

The computer program according to the disclosure provides that all steps of the method according to the disclosure are carried out if it is run on a computer, in particular a controller.

The computer program product according to the disclosure with program code stored on a machine-readable medium performs the method according to the disclosure if the program is run on a computer.

BRIEF DESCRIPTION OF THE DRAWINGS

Exemplary embodiments of the disclosure are presented in the drawings an are explained in more detail in the description below.

In the drawings:

FIG. 4 shows a method for the operation of the parking brake and FIG. 5 shows another method for the operation of the parking brake.

DETAILED DESCRIPTION

Figure 1:
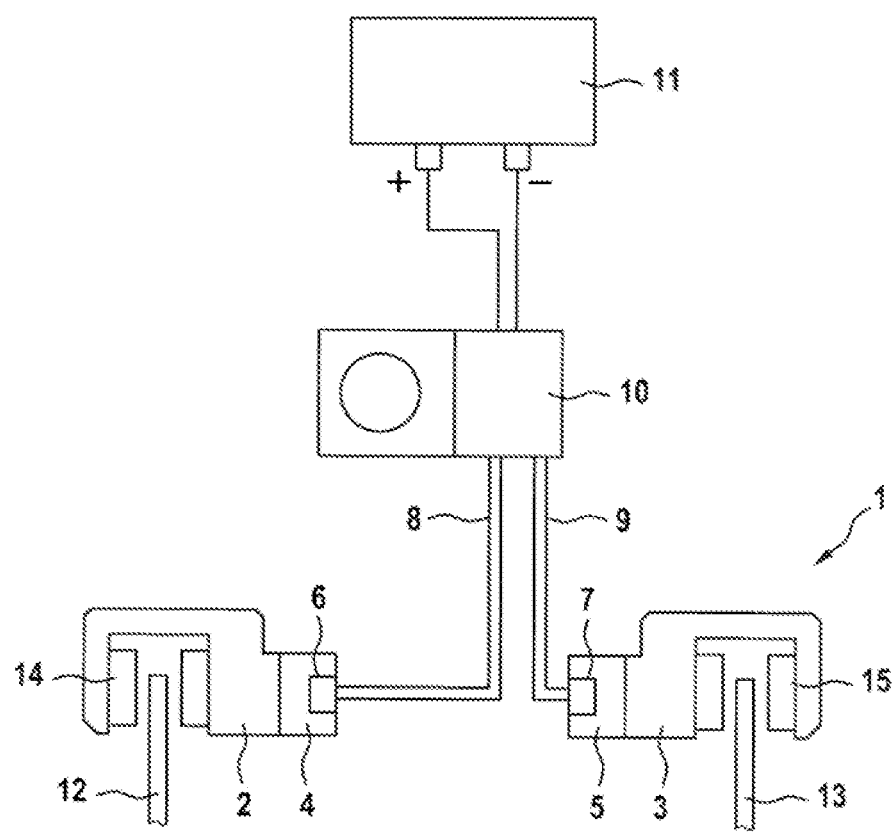
FIG. 1 shows a parking brake in a simplified representation.

FIG. 1 shows a parking brake 1 for a motor vehicle in a simplified representation. The parking brake 1 comprises two wheel brake devices 2, 3, wherein one of the wheel brake devices 2 is associated with a left wheel of a rear axle of the motor vehicle and the other wheel brake device 3 is associated with the right wheel of the rear axle of the motor vehicle. Both wheel brake devices 2, 3 comprise an actuator 4 or 5, each of which comprises an electric motor 6, 7. The electric motors 6, 7 are each connected by an electric line 8, 9 to a controller 10, which is in turn connected to a vehicle electrical system 11 and/or to a vehicle battery associated with the vehicle electrical system 11. The controller 10 controls the electric motors 6, 7 to actuate the wheel brake device 2, 5. The actuators 4, 5 each clamp a brake disk 12, 13 associated with the respective wheel between a respective pair of brake jaws 14, 15 of the respective wheel brake device 2, 3.

For this each electric motor 6, 7 is connected by a spindle to a respective brake piston that applies a suitable actuating force to one of the brake jaws of the respective pair 14, 15. By means of a floating mounting of the other brake jaw of the pair of brake jaws, as a result of this both brake jaws are pressed against the respective brake disk 12, 13 in the usual way, so that the respective brake disk 12, 13 is clamped between the two brake jaws. In this state the brake piston is in a clamping position. If the respective brake piston is retracted by the electric motor 6,7 from the clamping position, so that the brake force acting on the brake disk 12, 13 is reduced, the parking brake 1 is released. For calibration of the parking brake 1, in particular for determining the position of the spindle and/or of the brake piston, it is known to move the brake piston into a release position in which the respective brake jaw is spaced apart from the brake disk 12, 13. In particular, the release position is defined by a mechanical end stop, against which the brake piston or in particular a spindle nut associated with the brake piston is moved that interacts with the spindle in order to move the brake piston into the clamping position if the spindle is driven by the electric motor 6, 7. Starting from said position, the brake piston is then moved into the clamping position by activating the electric motor 6, 7. As a result of this, the piston is moved from one end position to another end position, in each of which a further movement of the piston is mechanically inhibited.

As a result of this, the spindle position for the normal operation of the parking brake 1 can be adjusted. The described method is in particular carried out again during the initial commissioning or even after the replacement of components of the parking brake 1. During the recalibration of the parking brake 1, the spindle position is initially not known to the controller 10. In order to determine the same, the previously described process is used and the respective brake piston is initially displaced into the release position, so that the parking brake 1 is fully open, then into the clamping position. The subsequently defined release process completes the (re-)calibration and the spindle position is again known to the controller 10.

Figure 2:
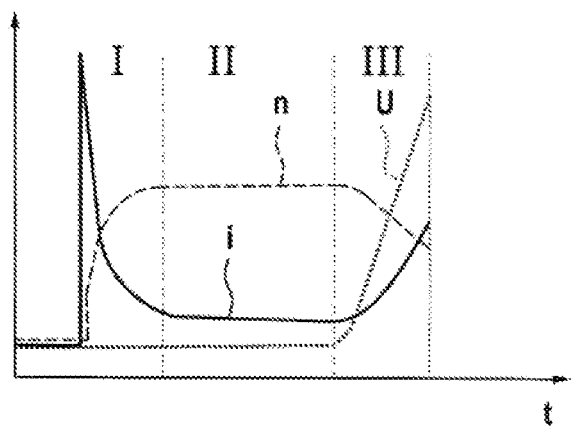
FIG. 2 shows signal profiles of the parking brake during a clamping process.

FIG. 2 shows the signal profiles of the parking brake 1 of the second step of the calibration process here, i.e. when the brake piston is driven into the clamping position. For this FIG. 2 shows the current i, the voltage U as well as the revolution rate n of the electric motor 6 plotted against the time t. In the following exemplary embodiment, the method will initially be discussed using the left wheel brake device 2. The method is obviously preferably used on both wheel brake devices 2, 3. The clamping process is divided into three phases I, II and III. In Phase I, characterized by switch-on current peaks, a plurality of motor parameters are determined, but at least the motor constant $k_M$ and the electric impedance R of the parking brake 1 or of the wheel brake device 2.

Phase II is a no-load phase. In this case there is a no-load current, while the revolution rate of the motor n remains constant. In said phase the free travel of the actuator 4 is overcome, in particular the free travel of a nut up to a piston base of the brake piston.

The rise of the current i as a result of the rise of the clamping force by applying the brake linings 14 to the brake disk 12 is characteristic of Phase III, the so-called force increase phase.

The no-load current measured in Phase II is detected or measured and advantageously stored in a non-volatile memory of the controller 10.

First the mechanical differential equation for the electric motor 6, which in the present case is in the form of an d.c. motor, is give in the following equation (1).

$$J(dw/dt)=k_M i-M_{Friction}-M_{Load} \quad (1)$$

Here $K_M$ is the motor constant of the electric motor 6, i is the measured current, $M_{Friction}$ the moment of friction of the electric motor 6, $W_{Load}$ is a load moment of the electric motor 6 and J(dw/dt) is the change in angular rate of the electric motor 6. For the no-load phase II the change in angular rate is negligible and thus disappears. As the system is in a no-load mode, there is also no load moment.

Equation (1) simplifies to the following equation (2), from which the moment of friction $M_{Friction}$ is calculated:

$$0=k_M i-M_{Friction} \quad (2)$$

Said equation assumes knowledge of the motor constant, which is determined in Phase I. The value of the calculated moment of friction is stored in a non-volatile memory of the controller 10.

Figure 3:
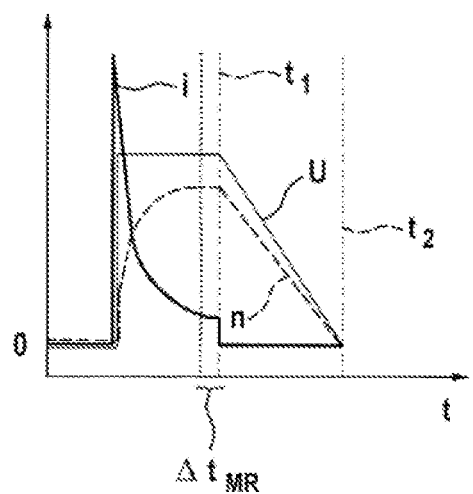
FIG. 3 shows signal profiles of the parking brake for an interruption of a power supply.

The method is now extended in the no-load phase II in that the power supply of the electric motor 6 is interrupted at a predetermined point in time in the no-load phase II. This is shown in FIG. 3 in a further diagram using the signal sales of the current i, the revolution rate n and the voltage U against time t. At a point in time $t_1$, the current feed is interrupted by the controller 10. A suitable point in time is the point in time of Phase II at which the value for the moment of friction of the electric motor 6 was determined, in particular in the time interval $\Delta t_{MR}$.

In principle, however, any other point in time in the no-load phase II can be used as the point in time $t_1$ at which it is ensured that the spindle comes to a complete standstill while still before overcoming the free travel and thus before reaching Phase III and the moment of friction up to switch-off is determined.

The speed information of the electric motor 6 is also stored in the non-volatile memory in addition to the information about the point in time $t_1$ of the event "switch-off" or "interruption of current feed". Once no change in the speed of the electric motor 6 is detected, the point in time $t_2$ of the occurrence of said event, i.e. of the electric motor 6 being at rest, is stored in the memory. The knowledge of the points in time $t_1$ and $t_2$ of the described events contributes to determining the change of speed in the time period between the events, as the same determine the time period to be investigated.

The following equation is the electric differential equation of the electric motor:

$$U_M = R_M i + L\frac{di}{dt} + k_M w \quad (3)$$

Here $U_M$ is the voltage of the motor, $R_M$ is the motor impedance, w is the revolution rate of the electric motor 6, L is the inductance of the electric motor 6, di/dt is the change of the current i against time t and $k_M$ is the motor constant of the electric motor 6.

Following switch-off of the current, equation (3) breaks down to equation (4) as follows:

$$U_M=k_M w \quad (4)$$

The motor constant $k_M$ is given by measurement of the induction voltage $U_M$ of the electric motor 6 and knowledge of the revolution rate w. Said value is stored in the memory and compared with the value determined in Phase I. If the comparison shows that the determined value differs from the previously determined value by more than a limit value that can be specified, then the value determined in the coasting phase, i.e. after interruption of the power supply, is stored and is further used as the motor constant. In this case the moment of friction is also re-calculated with the updated parameter.

For the coasting process, current i disappears in the mechanical differential equation, because the circuit is no longer closed. Phase II is characterized in that there is no load moment. For this reason equation (1) simplifies to equation (5):

$$J(dw/dt)=--M_{Friction} \quad (5)$$

The rate of change of angular rate dw/dt is preferably determined by usual methods, in particular by time differentiation of the angular rate, estimations or determination by system identification methods. The moment of friction $M_{Friction}$ is determined from equation (2). Equation (5) is preferably not evaluated over the entire duration of the time range explained in the section above. The points in time at which the speed signal cannot be differentiated, for example at the point in time $t_1$ or $t_2$, are not taken into account because it is not possible to specify a current rate of change at said points in time because of sudden changes. The moment of inertia calculated in each time step is averaged in a suitable manner.

The now determined moment of inertia is advantageously compared with the standard value stored in the controller. The result is assessed in a suitable manner in order to take potential measurement errors into account to a lesser extent. If it is determined that the moment of inertia is above or below a tolerated range of the standard value, then the newly determined value of the moment of inertia is not trusted. The system assumes an erroneous measurement and the value is not used. If the moment of inertia determined by the described methods is within the range to be tolerated, then the newly determined value is stored in the non-volatile memory of the controller 10 and is used as a motor parameter for the force estimation algorithm for activating the parking brake 1.

Once the electric motor 6 is at a standstill and the calculation as well as the comparison of the moment of inertia have been completed, the electric motor 6 is energized again such that the described clamping process within the (re-)calibration is completed.

The force estimation for actuating the parking brake 1 is then based on the calculation of the mechanical differential equation, see equation (1). Accurate knowledge of the moment of inertia is therefore advantageous for an accurate estimation of the clamping force.

It is advantageously provided that datasheet values, for example of motor constant and motor impedance, are accessed for determination of the moment of inertia. Advantageously, the motor parameters motor constant and motor impedance are estimated for determining the moment of inertia during the switch-on current peaks (Phase I) up to the start of the coasting process ($t_1$).

FIGS. 4 and 5 show the described method once again in the form of an overview in respective flow charts.

FIG. 4 shows the method for the determination of the moment of inertia. This starts in step S1 with the start of the (re-)calibration process. For this in a step S2 the brake piston is first displaced into the release position and then towards the clamping position by voltage reversal of the electric motor 6. Here the moment of friction $M_{Friction}$, in the no-load phase II is determined according to equation (2) in a step S3.

Then the electric motor 6 is switched off or the power supply to the electric motor 6 is interrupted in a step S4.

Then the moment of inertia is determined as previously described according to equation (5) in a step S5. The comparison of the determined moment of inertia with a previously stored value of the moment of inertia takes place in a subsequent step S6. In the event of a small deviation, of for example less than 10%, the last determined moment of inertia is used as a new value for the moment of inertia and is stored in step S7.1. The stored moment of inertia may be weighted. If the result of the comparison is that the determined moment of inertia deviates from the previously stored moment of inertia by more than a value that can be specified, for example by more than 10%, then the newly determined value is discarded in step S7.2 and the previously stored value continues to be used.

The selected value is then used as the basis for the further operation of the parking brake in step S8.

FIG. 5 shows the method for determining the motor constant $k_M$. During this steps S1, S2 and S4 first follow one another. In a subsequent step S9 the motor constant $k_M$ is determined according to equation (4), as previously described.

The determined motor constant is then compared with a previously stored motor constant in a step S10. If the determined motor constant deviates from the previously stored motor constant by more than a limit value that can be specified, for example 5%, then the determined motor constant is determined as a new parameter in a step S11.1. If the determined motor constant does not deviate from the stored motor constant by more than the limit value that can be specified, then the previously stored motor constant continues to be specified and used as a motor parameter for the activation of the parking brake 1 in step S11.2.

What is claimed is:

1. A method of operating a parking brake of a motor vehicle, the motor vehicle comprising at least one wheel brake device that includes an electric motor configured to actuate and drive a spindle to displace a brake piston between a clamping position and a release position, the method comprising:
   operating the electric motor to move the brake piston into the release position, during a calibration of the parking brake;
   applying a no-load current to the electric motor to move the brake piston from the release position towards the clamping position, during the calibration of the parking brake; and
   as the brake piston moves from the release position towards the clamping position:
      interrupting a power supply of the no-load current to the electric motor in a no-load phase prior to the brake piston reaching the clamping position; and
      determining at least one motor parameter of the electric motor based on a coasting behavior of the electric motor during the interrupting of the no-load current and prior to the brake piston reaching the clamping position.

2. The method according to claim 1, the determining of the at least one motor parameter further comprising:
   determining a moment of inertia of the electric motor based on a change of rotational speed of at least one of the electric motor and the spindle.

3. The method according to claim 1, the determining of the at least one motor parameter further comprising:
   determining a moment of inertia of the electric motor based on a moment of friction of the electric motor.

4. The method according to claim 1, the determining of the at least one motor parameter further comprising:
   determining a moment of friction before the interruption of the power supply and based on a stored motor constant of the electric motor.

5. The method according to claim 1, the determining of the at least one motor parameter further comprising:
   determining a motor constant of the electric motor based on the coasting behavior of the electric motor,
   wherein the coasting behavior is an induction voltage of the electric motor when coasting.

6. The method according to claim 5, the determining of the at least one motor parameter further comprising:
   comparing the determined motor constant with a stored motor constant; and
   storing the determined motor constant if the determined motor constant deviates from the stored motor constant by more than a predetermined limit value.

7. The method according to claim 4, the determining of the at least one motor parameter further comprising:
   comparing the determined moment of friction with a previously determined moment of friction; and
   discarding the determined moment of friction if the determined moment of friction deviates from the previously determined moment of friction by more than a predetermined limit value.

8. A parking brake for a motor vehicle, the parking break comprising:
   at least one wheel brake device that includes an electric motor configured to actuate and drive a spindle to displace a brake piston between a clamping position and a release position; and
   a controller operably connected to the electric motor of the at least one wheel brake device and being configured to, during a calibration of the parking brake:
      operate the electric motor to move the brake piston into the release position;
      applying a no-load current to the electric motor to move the brake piston from the release position towards the clamping position; and
      as the brake piston moves from the release position towards the clamping position:
         interrupt a power supply of the no-load current to the electric motor in a no-load phase prior to the brake piston reaching the clamping position; and
         determine at least one motor parameter of the electric motor based on a coasting behavior of the electric motor during the interrupting of the no-load current and prior to the brake piston reaching the clamping position.

* * * * *

UNITED STATES PATENT AND TRADEMARK OFFICE
CERTIFICATE OF CORRECTION

| | |
|---|---|
| PATENT NO. | : 9,829,058 B2 |
| APPLICATION NO. | : 14/810528 |
| DATED | : November 28, 2017 |
| INVENTOR(S) | : Martin Holder |

Page 1 of 1

It is certified that error appears in the above-identified patent and that said Letters Patent is hereby corrected as shown below:

In the Claims

In Column 8, Lines 36-37, Lines 1-2 of Claim 8 should read:
8. A parking brake for a motor vehicle, the parking brake comprising:

Signed and Sealed this
Twenty-fourth Day of April, 2018

Andrei Iancu
*Director of the United States Patent and Trademark Office*